US008315633B2

(12) United States Patent
Sambhwani et al.

(10) Patent No.: US 8,315,633 B2
(45) Date of Patent: Nov. 20, 2012

(54) UPLINK SOFT HANDOFF SUPPORT IN UMTS TDD SYSTEMS FOR EFFICIENT UPLINK POWER AND RATE CONTROL

(75) Inventors: Sharad Deepak Sambhwani, San Diego, CA (US); Avneesh Agrawal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1053 days.

(21) Appl. No.: 11/357,552

(22) Filed: Feb. 16, 2006

(65) Prior Publication Data

US 2007/0049280 A1 Mar. 1, 2007

Related U.S. Application Data

(60) Provisional application No. 60/711,974, filed on Aug. 26, 2005.

(51) Int. Cl.
*H04Q 7/20* (2006.01)
(52) U.S. Cl. ........ 455/442; 455/450; 455/443; 455/446; 455/435.1; 455/452.1; 455/509; 455/522
(58) Field of Classification Search .................. 455/436, 455/442, 522
See application file for complete search history.

(56) References Cited

U.S. PATENT DOCUMENTS

| | | | |
|---|---|---|---|
| 6,845,238 B1* | 1/2005 | Muller | 455/436 |
| 2001/0046211 A1 | 11/2001 | Maruwaka et al. | |
| 2001/0462180 | 11/2001 | Mauro Costa et al. | |
| 2003/0013475 A1* | 1/2003 | Yoshimura | 455/522 |
| 2003/0119452 A1 | 6/2003 | Kim et al. | |
| 2004/0157609 A1* | 8/2004 | Jalloul et al. | 455/442 |
| 2004/0202131 A1* | 10/2004 | An et al. | 370/331 |
| 2005/0070287 A1* | 3/2005 | Cave et al. | 455/436 |
| 2006/0209721 A1* | 9/2006 | Mese et al. | 370/254 |

FOREIGN PATENT DOCUMENTS

| | | |
|---|---|---|
| FR | 2842048 A1 | 1/2004 |
| JP | 2002534931 | 10/2002 |
| JP | 2002325063 | 11/2002 |

(Continued)

OTHER PUBLICATIONS

International Search Report and Written Opinion—PCT/US2006/033228, International Search Authority—European Patent Office—Mar. 19, 2007.

(Continued)

*Primary Examiner* — Olumide T Ajibade Akonai
*Assistant Examiner* — Randy Peaches
(74) *Attorney, Agent, or Firm* — Darren M. Simon

(57) ABSTRACT

Systems and methodologies are described that facilitate supporting uplink soft handoff in a UMTS TDD wireless communication environment. A virtual active set (VAS) for each user device can be generated at the network side of the communication environment, and sectors listed in each VAS can be informed of their respective listings. Sectors in a user device's VAS can be provided with a scrambling code and resource assignments from a nominal sector serving the user device, which information can be employed to attempt to receive and demodulate uplink signals from the user device at all base stations in the VAS thereof. Additionally, such resources can be employed to transmit power control and reverse activity commands to the user device on the downlink.

26 Claims, 10 Drawing Sheets

FOREIGN PATENT DOCUMENTS

| | | |
|---|---|---|
| JP | 2003518801 | 6/2003 |
| JP | 200488332 | 3/2004 |
| KR | 20010023790 | 3/2001 |
| RU | 2236757 | 9/2004 |
| RU | 2249915 | 4/2005 |
| RU | 2258310 | 8/2005 |
| WO | WO99013675 | 3/1999 |
| WO | WO00062443 | 10/2000 |
| WO | WO0230009 A1 | 4/2002 |
| WO | WO0337029 | 5/2003 |
| WO | WO2004006466 A2 | 1/2004 |
| WO | WO2004075473 A | 9/2004 |
| WO | WO200501657 | 1/2005 |
| WO | WO2005046259 A2 | 5/2005 |

OTHER PUBLICATIONS

3GPP, Radio Resource Control (RRC) protocol specification, ETSI TS 125 331, ETSI, Jun. 30, 2005, V6.6.0 (Jun. 2005), p. 1161-1163.
3GPP, Radio resource management strategies (Release 6), 3GPP TR 25.922, 3GPP, Jun. 30, 2005, V6.1.0 (May 2005), p. 16-18.

* cited by examiner

UPLINK SOFT HANDOFF SUPPORT IN UMTS TDD SYSTEMS FOR EFFICIENT UPLINK POWER AND RATE CONTROL

CLAIM OF PRIORITY UNDER 35 U.S.C. §119

The present application for patent claims priority to Provisional Application No. 60/711,974 entitled "UPLINK SOFT HANDOFF SUPPORT IN UMTS TDD SYSTEMS FOR EFFICIENT UPLINK POWER AND RATE CONTROL" filed Aug. 26, 2005, and assigned to the assignee hereof and hereby expressly incorporated by reference herein.

BACKGROUND

I. Field

The following description relates generally to wireless communications, and more particularly to providing uplink soft handoff of a user device using a virtual active set in a universal mobile telecommunication system wireless environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Conventional UMTS TDD systems do not support soft handoff on the uplink, which can cause undesired interference in an adjacent sector during power transmission from a user device to its serving sector. The interfered sector has no recourse in a conventional system to reduce the power of the interfering user device because the interfering user device does not listen to transmissions other than those from its serving sector. Thus, there is an unmet need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with supporting uplink soft handoff in a UMTS TDD wireless communication environment. According to one aspect, a virtual active set (VAS) for each user device can be generated at the network side of the communication environment, and sectors listed in each VAS can be informed of their respective listings. Sectors in a user device's VAS can additionally be provided with a scrambling code and resource assignments (e.g., time slots, channels, etc.) from a nominal sector serving the user device, which information can be employed to attempt to receive and demodulate uplink signals from the user device at all base stations in the VAS thereof. Additionally, such resources can be employed to transmit power control and reverse activity commands to the user device on the downlink.

According to another aspect, a method of performing soft handoff in a wireless communication environment can comprise evaluating a virtual active set (VAS) of a user device at a sector base station, wherein the VAS comprises a list of sectors capable of receiving and demodulating user device transmissions, providing all sectors listed in the VAS with channel and resource assignment information related to the user device and a scrambling code employed by the user device, and receiving and demodulating communication signals from the user device at all sectors listed in the VAS. The method can further comprise transmitting power control commands and reverse activity commands to the user device from all sectors listed in the VAS. Additionally, the method can comprise identifying a user device that is causing interference in a sector listed in its VAS, and providing a power control or reverse activity command from the interfered sector to reduce transmission power or data rate in the user device and mitigate the interference.

According to another aspect, an apparatus that facilitates uplink soft handoff in a wireless communication environment can comprise a memory in a base station that stores information related to a user device with a sector list in which the base station is listed, and a processor that analyzes information stored in the memory, processes information received from the user device using a scrambling code assigned to the user device, and initiates transmission of power control and reverse activity commands to the user device. The sector list can comprise a list of all sectors attempting to receive and demodulate signals from the user device, including a nominal sector that assigns the scrambling code and communication resources to the user device. All sectors in the sector list can transmit at least one of power control and reverse activity commands to the user device using the nominal sector scrambling code. Additionally, the processor can identify a user device as offensive when the user device transmits at a power level above a predetermined threshold and causes interference at the sector base station, and can initiate transmission of a power control or reverse activity command to the offensive user device instructing the offensive user device to reduce transmit power or data rate below the predetermined threshold to mitigate interference.

According to yet another aspect, an apparatus that facilitates supporting uplink soft handoff in a wireless communication environment can comprise means for evaluating a virtual active set (VAS) for a user device, the VAS comprises a list of all sectors capable of receiving and demodulating signals from the user device and means for transmitting power control and reverse activity commands to the user device from all sectors listed in the VAS. The apparatus can further comprise means for detecting an offending user device that transmits at a power level above a predetermined threshold and causes interference at a sector base station, and the interfered base station can transmit a power control or reverse activity command to cause the user device to reduce transmission power or data rate and mitigate interference in the offended sector base station. Moreover, the apparatus can comprise means for monitoring a plurality of sectors' ability to receive and demodulate signals from the user device, and means for updating the VAS periodiodically, based at least in part on information generated by the means for monitoring.

Still another aspect relates to a computer-readable medium having stored thereon computer-executable instructions for generating a list of sectors at a base station that comprises the identities of all sectors capable of receiving and demodulating signals from a user device, and transmitting power control and reverse activity commands to the user device from all sectors identified in the list of sectors. The computer-readable medium can further comprise instructions for identifying a user device that is causing interference in a sector listed in its list of sectors, and for transmitting a power control or reverse activity command from the interfered sector to the user device causing the interference, wherein the command instructs the user device to transmit at a lower power level or at a lower data rate. Additionally, the computer-readable medium can comprise instructions for updating the list of sectors periodically based at least in part on measurements related to capability of a plurality of sectors to receive and demodulate communication signals from the user device.

Yet another aspect relates to a processor in a base station that executes instructions for uplink soft handoff in a wireless communication environment, the instructions comprising analyzing a virtual active set (VAS) comprising a list of all sectors capable of communicating with a user device, verifying that the base station is listed in the VAS for the user device, receiving and demodulating communication signals from the user device, and transmitting power control and reverse activity commands to the user device. The processor can further execute instructions for transmitting data signals to the user device if the base station is in a nominal sector of the user device, and for employing a scrambling code and communication resources assigned to the user device by a nominal sector if the base station is not in the nominal sector of the user device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
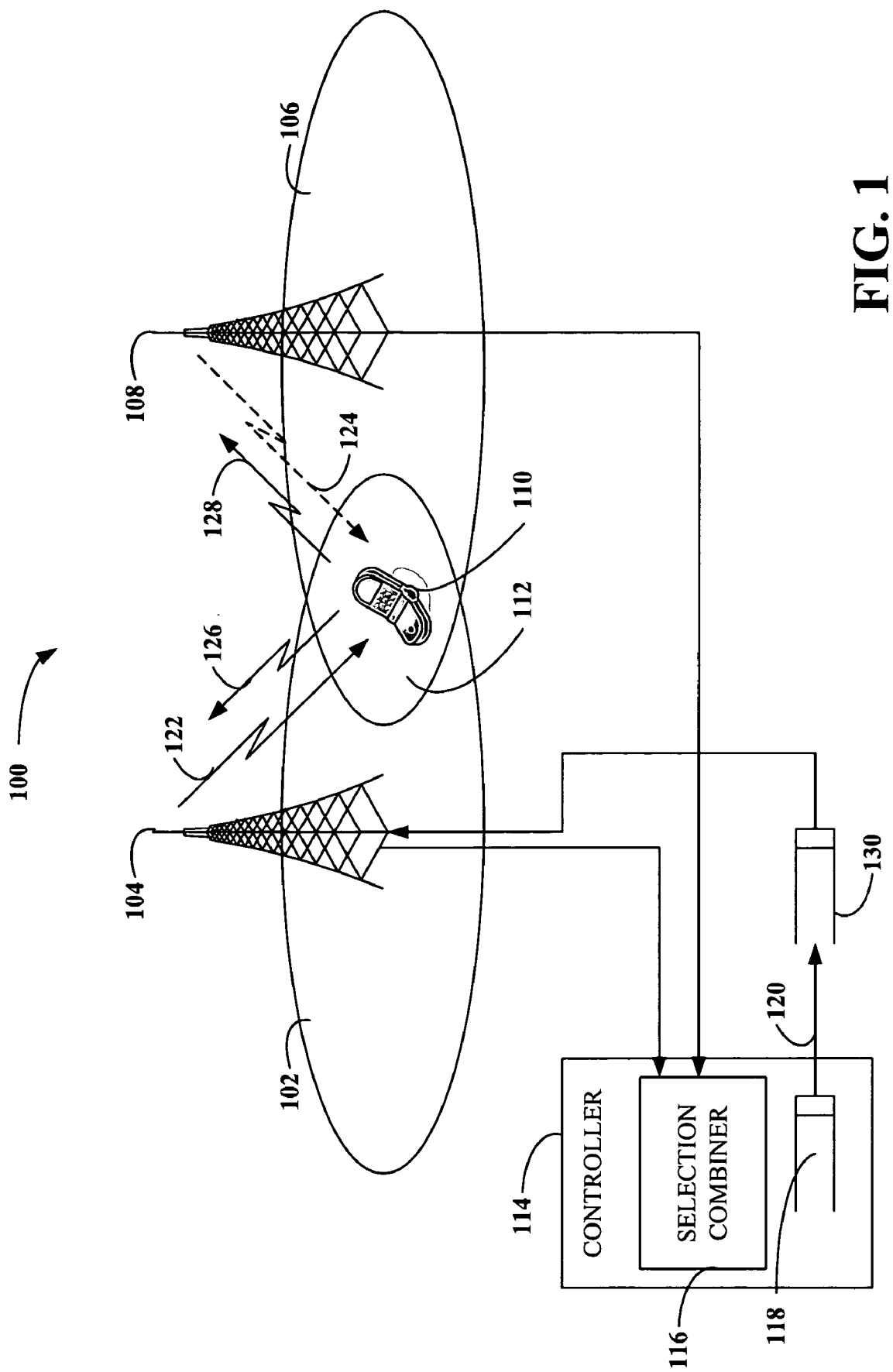
FIG. 1 illustrates a system wherein uplink soft handoff is enabled in a cdma2000 1x evolution data optimized (EvDO) wireless communication environment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

According to various aspects, systems and methods that facilitate soft handoff on the uplink in UMTS TDD systems are described herein. Uplink soft handoff is a desired feature of CDMA systems to facilitate control of the transmit power of a user device so that the residual frame error rate (FER) at the network controller is at a particular set value. Therefore, the user device ends up transmitting the minimum power that enables it to achieve that target FER set-point at the network controller without unnecessary power waste and without undesired increases in interference in its own sector or adjacent sectors. In addition, uplink soft handoff enables each individual receiving sector to control system load by transmitting information related to reverse activity. Thus, user devices can receive information related to system load and whether a given user device should reduce its transmit data rate to reduce the interference level (RoT). Accordingly, various aspects set forth herein describe an algorithm that enables the implementation of soft handoff in the uplink of UMTS TDD systems. Additionally, such systems and methods apply to the low chip rate (LCR) as well as the high chip rate (HCR) versions of UMTS TDD.

Referring now to FIG. 1, a system 100 is illustrated wherein soft handoff is enabled in a cdma2000 1x evolution data optimized (EvDO) wireless communication environment. A first sector 102 in a first base station 104 is illustrated with a coverage area that overlaps with a second sector 106 in a second base station 108. The first base station 104 and the second base station 108 may or may not be the same base station. A user device 110 is shown in the overlapping area 112. This area is the soft-handoff region in a case where the first base station 104 is different than the second base station 108, or is the softer-handoff region in case where the first base station 104 is the same as the second base station 108. Accordingly, both first sector 102 and second sector 106 are in an active set of user device 110. In a case where the first base station 104 and the second base station 108 are different base stations, base station controller 114 is illustrated with a selection combiner 116 that combines uplink traffic from base stations 104 and 108. Additionally, controller 114 comprises a queue 118 that temporarily stores data packets for transmission on the downlink. Base station 104 (e.g., the transmitting base station in this illustration) is associated with a queue 130. Downlink data 120 is transmitted between the queues 118 and 130 to base station 104, which in turn transmits data to user device 110. Downlink information 122 can be transmitted from base station 104 to user device 110, and can comprise downlink data, uplink power control information, and reverse activity information. It will be appreciated that base station 108 can transmit a signal 124 comprising power control information and reverse activity information as well, but does not transmit downlink data. User device 110 can communicate with base stations 104 and 108 by transmitting uplink signals 126 and 128, respectively, which can comprise data as well as serving cell information. It will be appreciated that signals 126 and 128 can be identical (e.g., can be a single signal transmitted to both base stations 104 and 108).

On the downlink of a conventional system EvDO, a single sector (e.g., sector 102) is the "serving sector" while the user device's uplink transmissions are demodulated and decoded by all the sectors in the user device's active set. Since the user device's transmissions on the uplink are demodulated and decoded by all the sectors in the user device's active set, the user device may select any of those sectors as the "serving sector." In EvDO, the pointing operation is performed by way of the download rate control (DRC) cover. Therefore, a change in the DRC cover in EvDO implies a change of serving sector, which can involve de-queuing and queuing packets at the sectors' transmit buffers. An abandoned sector will de-queue that user device from its transmit buffer and the new serving sector will queue the user device's data into its transmit buffer. The de-queuing/queuing operation may be carried out faster or slower depending on the implementation. For example, packet data queues can be retained at the controller and a replica thereof at the serving sector. If a new sector is chosen, the new sector's queue can be filled out from the controller or from the old serving sector as the old serving sector may be geographically collocated with the new serving sector (e.g., if both sectors belong to the same cell site). Two delays, namely, SoftHandoffDelay and SofterHandoffDelay can be employed to give the user device an estimate of the "cost" (in time) to change serving sector. Such estimate values can be used by the user device's re-pointing algorithm to select an adequate hysteresis governing the algorithm.

Thus, FIG. 1 shows the transmission and reception of downlink and uplink waveforms in an EvDO system. As can be seen from the figure, just one sector (sector 102) sends traffic data on the downlink for a given user. However, all the sectors in the active set of the user device will send uplink power control commands in their respective downlink transmissions to power control the user device's transmit power to an effective PER of 1% at the output of the selection combiner 116 of the controller 114. Also, all the sectors in the active set of user device 110 can send reverse activity commands in their respective downlink transmissions to rate-control the user device's transmit data rate to a level that does not compromise the maximum allowable uplink load. The rate control commands, by way of a reverse activity bit, can control system load (RoT) as seen by each sector in the user device's active set. Such commands comprise a single bit that indicates whether system load as seen by a particular sector is above a desired threshold value.

Note that different rules may be used for the interpretation of the power and rate control commands. The EvDO air interface specifies rules that the user device needs to follow upon reception of the power control and reverse activity commands. In brief, the rule "OR of downs" is used for the power control commands. This rule suggests that as long as there is a single sector indicating a "down" power control command, the user device shall reduce its transmit power as at least that sector is able to receive the user device transmission adequately. In contrast, the "OR of busy" is employed for the reverse activity commands. Analogously, this rule implies that as long as there is a single sector indicating that the system load is too high, the user device will initiate some procedure to reduce its transmit rate and hence statistically reduce the system load inflicted.

Figure 2:
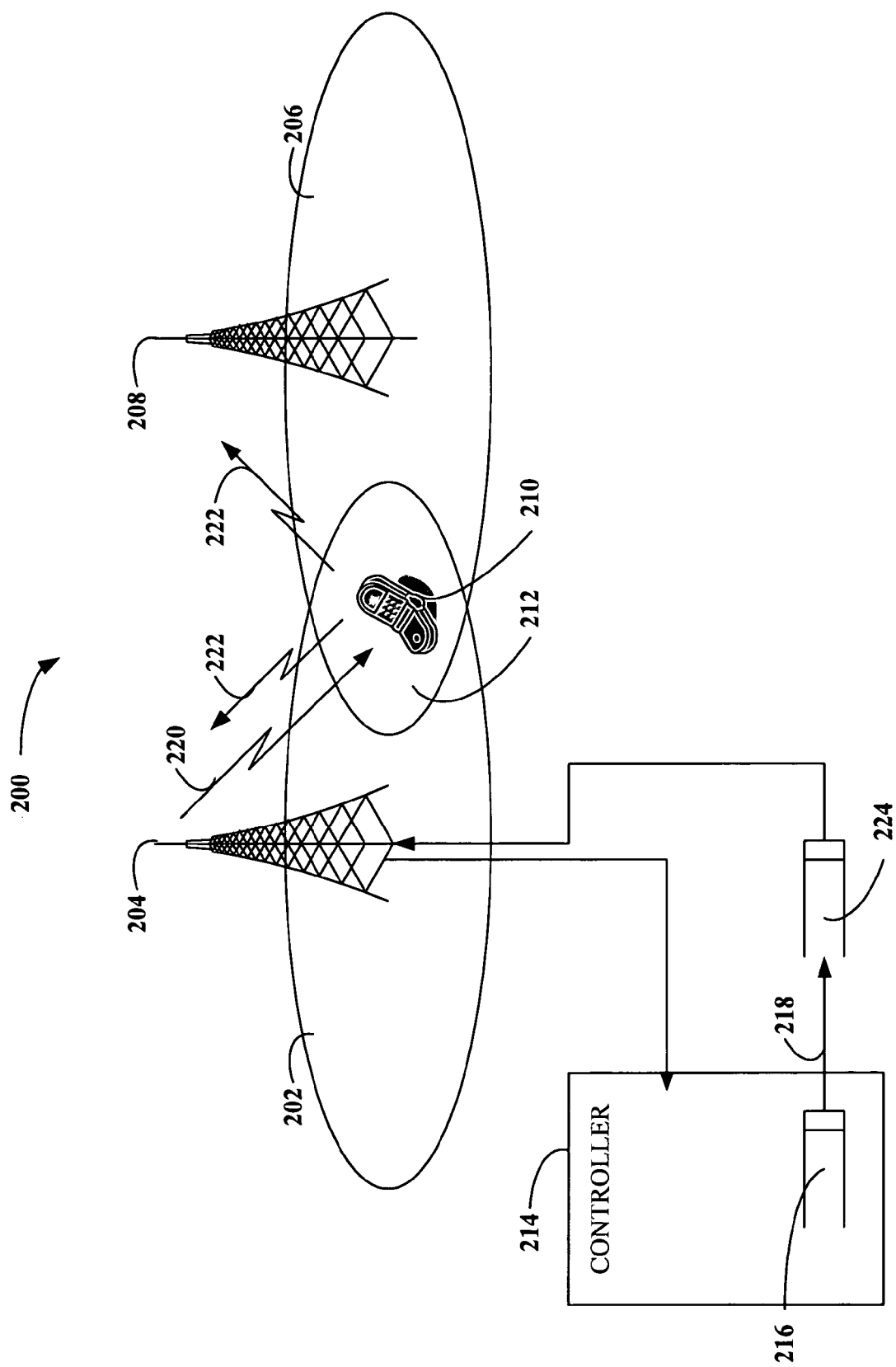
FIG. 2 is an illustration of a system that facilitates communication in a UMTS TDD communication environment according to the UMTS TDD Standard.

FIG. 2 is an illustration of a system 200 for communication in a UMTS TDD communication environment according to the UMTS TDD Standard. Current UMTS TDD systems do not provide for uplink soft handoff due to the manner in which the standard is written and in which subscriber units and infrastructure are implemented. According to the figure, a first network sector 202 is depicted in a first base station 204, and which overlaps with a second network sector 206 in a second base station 208. A user device 210 is shown in a region 212 where sectors 202 and 206 overlap. According to the figure, sector 202 is the serving sector for user device 210, and thus transmits downlink data from a controller 214, which comprises a queue 216 similar to the queue described with regard to FIG. 1. Controller 214, via queue 216, transmits on the downlink packet data 218 to another queue 224 associated with sector 202 and/or base station 204. Downlink information is then transmitted from the serving sector base station 204 to user device 210 via a signal 220 comprising downlink data as well as uplink power control information. User device 210 can then transmit information on the uplink 222, which data can be transmitted with serving sector-specific scrambling code. Thus, although signal 222 is illustrated as being transmitted to both base station 204 and base station 208, only base station 204 (e.g., the serving sector base station) will decode the uplink data transmission.

The main characteristic of the transmission and reception in a UMTS TDD system is the scrambling code used for the transmission of data to and from a user device. Such codes are typically 16 chips in length and fully define a sector, such that each sector in the system can have a unique scrambling code assigned for its transmissions. Thus, the same scrambling code used for downlink transmissions from sector 202 can be used by user device 210 for its transmissions.

As can be seen in FIG. 2, there is a single link in the downlink and in the uplink connecting the network side with user device 210 at a given time. Such is true despite the fact that user device 210 is in the coverage area of both sectors 202 and 206. In such a conventional UMTS system, there is no soft handoff on the uplink (contrary to the EvDO system), and there is also no multi-sector power or rate control for the adjustment of the user device's transmit power or rate. The sector from which the scrambling code is used for transmission can be denoted as the "nominal sector," which is the only relevant sector for the user device in a typical UMTS TDD communication environment. Advanced multi-user detection (AMUD) techniques can enable the reception of user device transmissions by sectors other than the nominal sector. Additionally, sectors with scrambling code different from that used by the user device, but which still attempt to receive and demodulate the user device's waveform, can be designated as "AMUD sectors".

In order for sector 206 to be expected to demodulate and decode user device's transmission, user device 210 would have to transmit using a scrambling code specific to sector 206. A user device implementation simultaneously carrying out communication over more than one sector can occur in the following two scenarios. According to a first scenario, the user device could transmit data scrambled using each of the sectors' respective scrambling codes, which requires more than one modulator and entails the user device utilizing uplink resources in more than one sector. However, such a scenario is impractical in that employing a plurality of modulators in a user device can be detrimental to a link budget associated with the user device. For example, a user device communicating with two sectors simultaneously and using respective scrambling codes associated therewith can reduce the uplink link budged by 3 dB.

According to a second scenario, user device transmissions using a particular scrambling code can be demodulated not only by the sector to which the scrambling code is assigned, but also by sectors that are able to receive the user device's transmissions. In this scenario, a sector receives waveforms from all user devices allocated to its scrambling code in addition to user devices that may be visible at its perimeter and which employ another sector's scrambling code.

Figure 3:
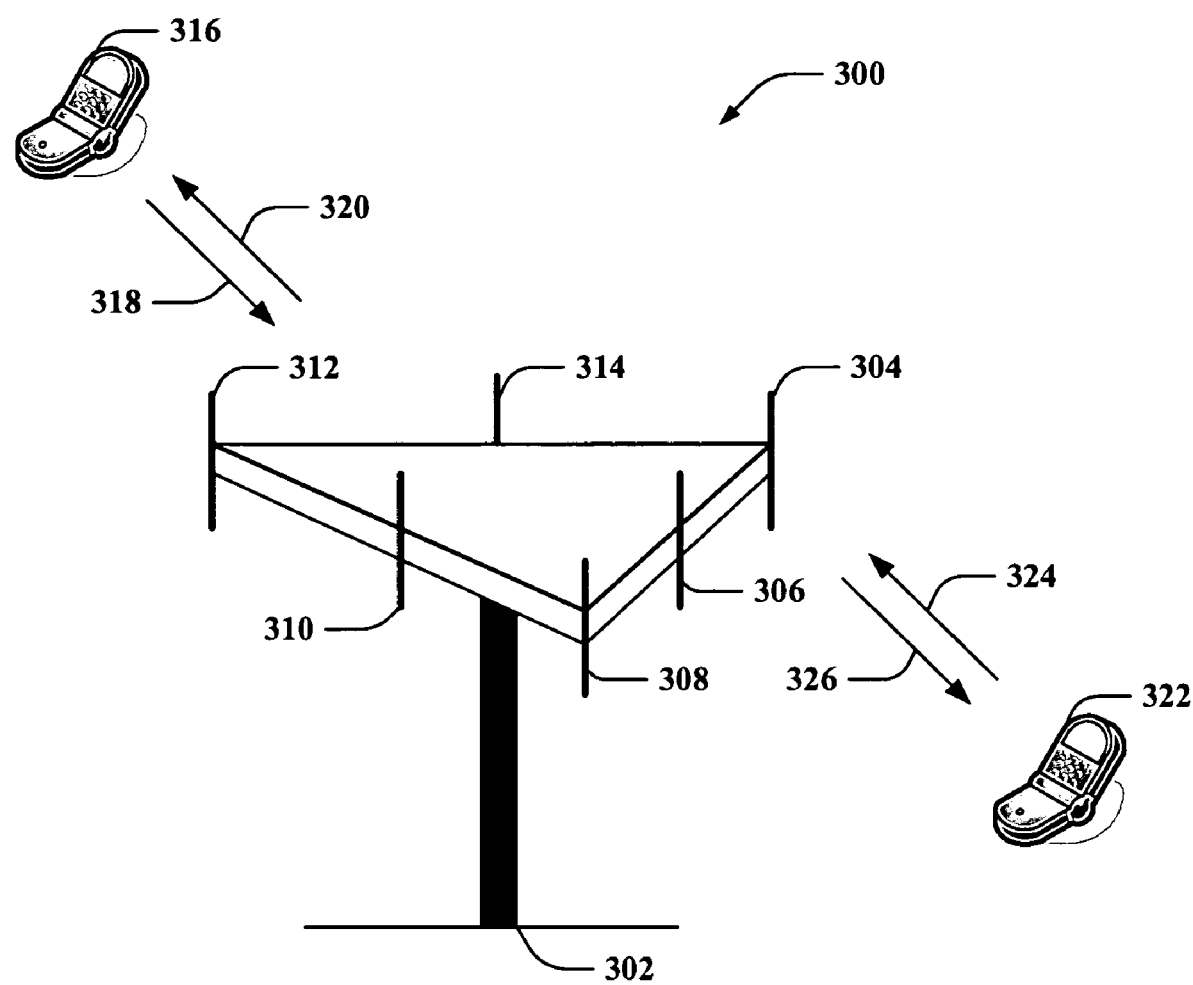
FIG. 3 is an illustration of a multiple access wireless communication system according to one or more embodiments.

FIG. 3 is an illustration of a multiple access wireless communication system 300, such as can be employed in conjunction with one or more embodiments set forth herein. A 3-sector base station 302 includes multiple antenna groups, one including antennas 304 and 306, another including antennas 308 and 310, and a third including antennas 312 and 314. According to the figure, only two antennas are shown for each antenna group, however, more or fewer antennas may be utilized for each antenna group, sets of receive and transmit antennas need not be equal in number. For example, a particular sector or cell can employ two receive antennas and one transmit antenna, or vice versa, or three transmit antennas and two receive antennas, etc. Additionally, sectors need not have equal numbers of antennas with respect to each other. For instance, a first sector can employ two receive antennas and two transmit antennas, a second sector can employ two receive antennas and one transmit antenna, a third sector can employ one receive antenna and one transmit antenna, and so on, such that any permutation of number and type of transmit and/or receive antennas can be employed by a given sector as will be appreciated by one skilled in the art.

Mobile device 316 is in communication with antennas 312 and 314, where antennas 312 and 314 transmit information to mobile device 316 over forward link 320 and receive information from mobile device 316 over reverse link 318. Mobile device 322 is in communication with antennas 304 and 306, where antennas 304 and 306 transmit information to mobile device 322 over forward link 326 and receive information from mobile device 322 over reverse link 324.

Each group of antennas and/or the area in which they are designated to communicate is often referred to as a sector of base station 302. In the illustrated embodiment, antenna groups are designed to communicate to mobile devices in a sector of the areas covered by base station 302. In communication over forward links 320 and 326, the transmitting antennas of base station 302 can utilize beam-forming techniques in order to improve the signal-to-noise ratio of forward links for the different mobile devices 316 and 322. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology. A user device or the like, as described herein can be, for example, a cellular phone, a smartphone, a laptop, a PDA, a handheld communication device, a handheld computing device, a satellite radio, a global positioning system, or any other suitable device for communicating over a wireless network, as will be appreciated by one skilled in the art.

Figure 4:
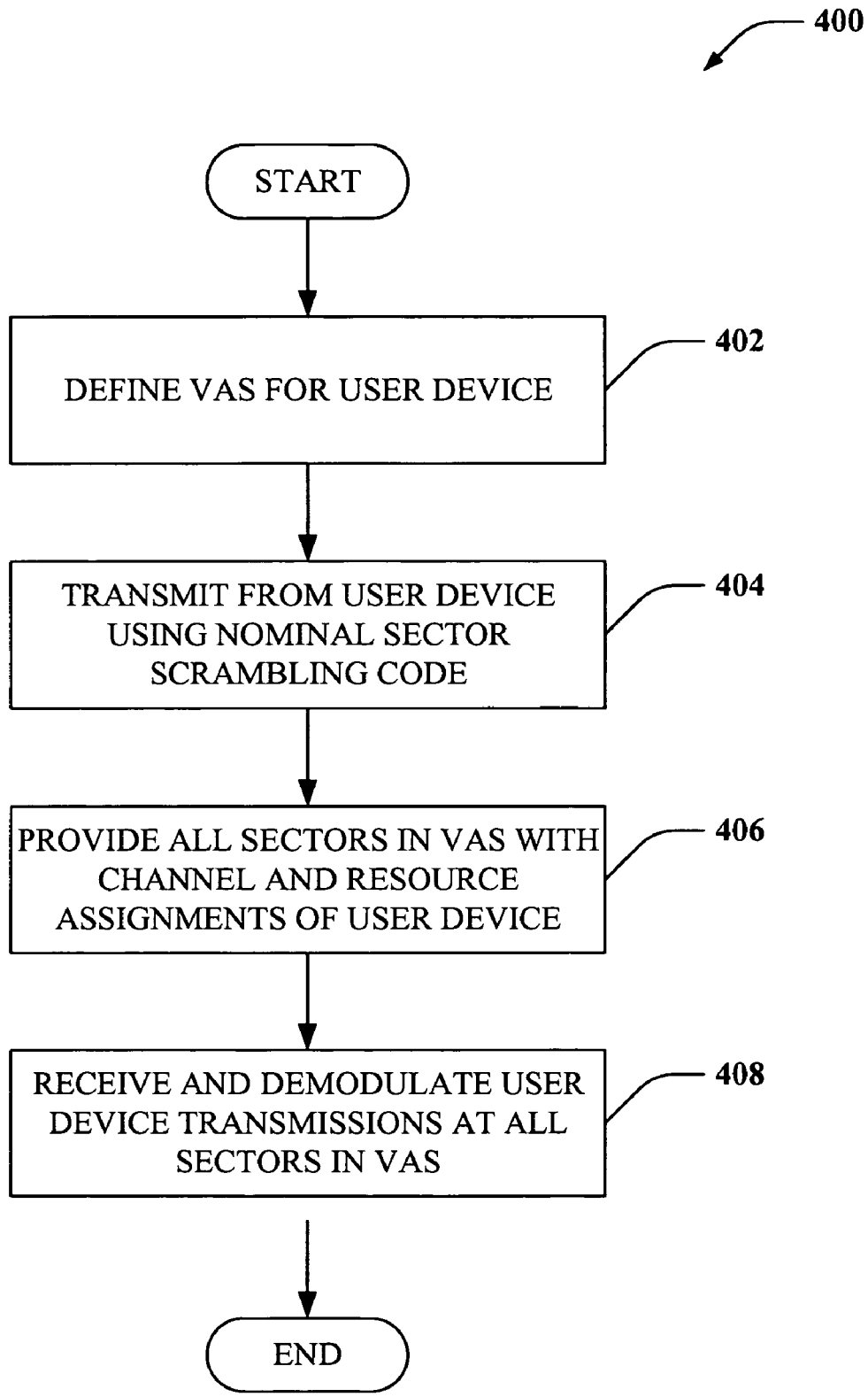
FIG. 4 is an illustration of a methodology for enabling uplink soft handoff in a UMTS TDD wireless communication environment using a virtual active set (VAS), in accordance with one or more aspects.
Figure 5:
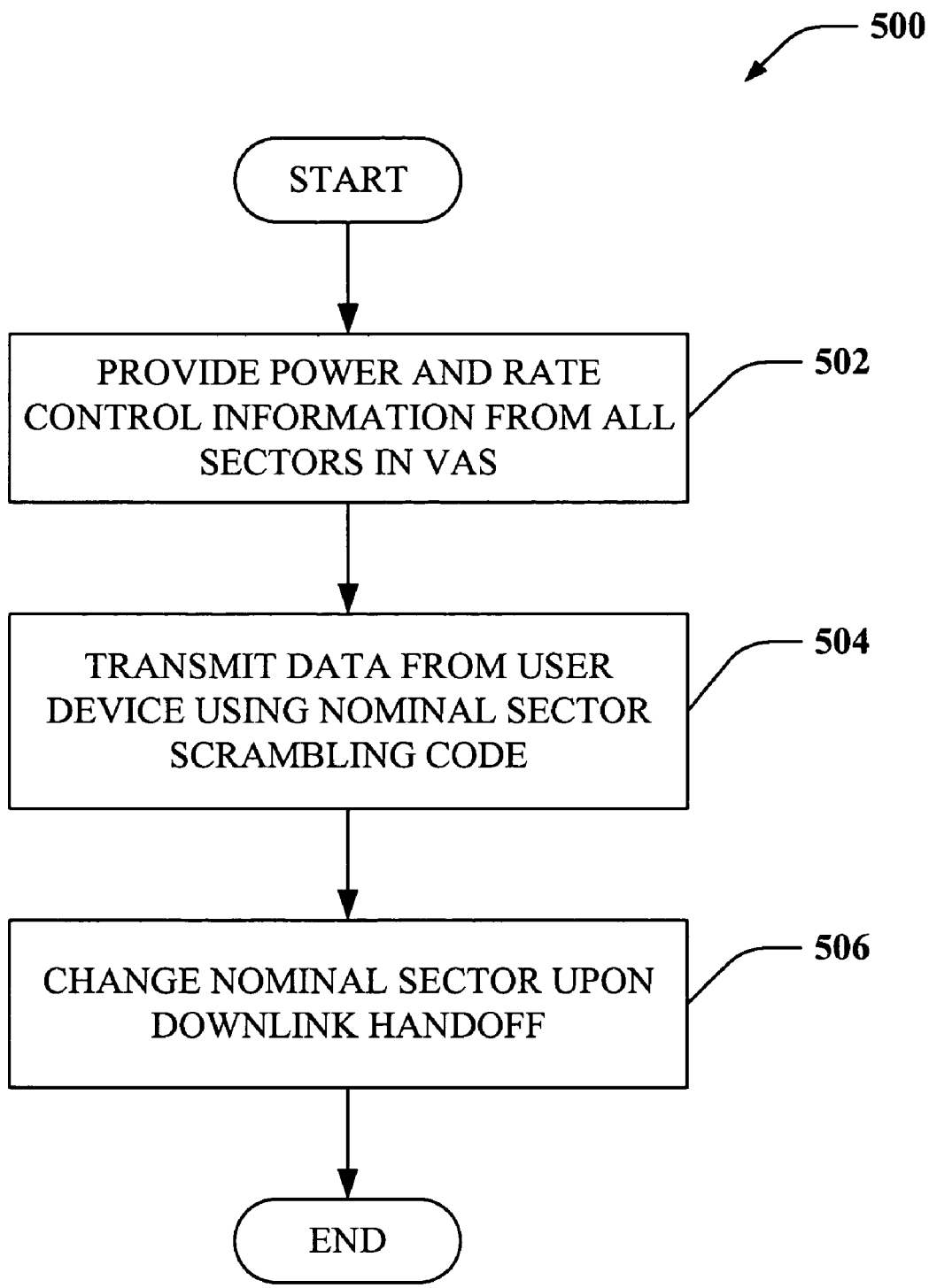
FIG. 5 is an illustration of a methodology for communicating information in a UMTS TDD communication environment using a VAS in accordance with one or more aspects described herein.
Figure 6:
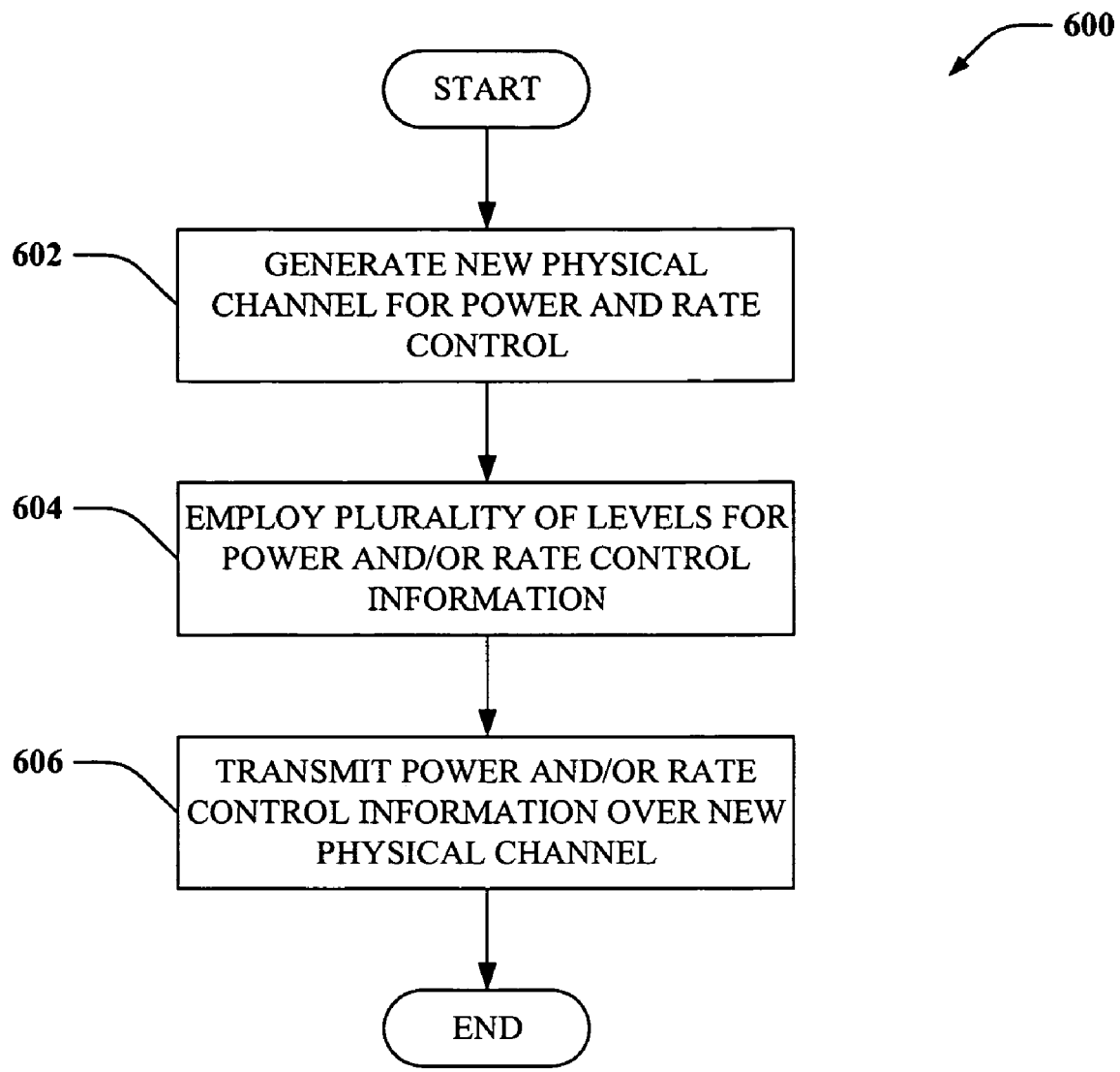
FIG. 6 illustrates a methodology for generating a physical channel dedicated for transmission of power and rate control information for a user device in a UMTS TDD wireless communication environment, in accordance with various aspects set forth herein.

Referring to FIGS. 4-6, methodologies relating to generating a VAS and/or supporting soft-handoff in a wireless communication environment are illustrated. For example, methodologies can relate to performing soft handoff in a UMTS TDD wireless environment, an OFDM environment, an OFDMA environment, a CDMA environment, a TDMA environment, a TDD environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 4 is an illustration of a methodology 400 for enabling soft handoff in a UMTS TDD wireless communication environment using a virtual active set (VAS), in accordance with one or more aspects. The VAS is a list of sectors that attempt to demodulate and decode a given user device's transmissions, and can be created at and known to the network side as well as to the user device itself. A nominal sector is the sector whose scrambling code the user device employs to transmit signals, and, therefore, is listed in the user device's VAS. As other sectors (AMUD sectors) become able to receive transmissions from the user device (e.g., as the user device approaches/enters such sectors' coverage areas), such sectors can be added to the VAS for the user device. In view of the foregoing, a VAS for a user device can be generated and/or defined at 402, and can be updated as the user device traverses coverage areas of a plurality of sectors. Sector capability to demodulate and decode user devices not formally belonging to the sector can be attempted by way of an AMUD algorithm (e.g., where the sector attempts to jointly demodulate user devices in sectors other than itself). The VAS can be updated over time with measurements from the network side related to a given sector's ability to continue demodulating signals from a user device that lists the sector in its VAS. At 404, user device transmissions can be performed using the scrambling code from the nominal sector associated with the user device. Thus, communication between the sectors (NodeB's) and a controller (RNC) can be provided to maintain an up to date VAS for all the user devices in the system. When there is a change in the user device's VAS, the network can inform the user device about it through signaling.

At 406, all sectors in the VAS can be provided with information related to channels and resources (e.g., time slots, channelization codes . . . ) assigned to the user device for communication on both the downlink and uplink. In this manner, AMUD sectors can retain information related to which channels can be received and demodulated when transmitted from the user device in whose VAS such AMUD sectors are listed. Thus, the notion of the VAS is reciprocal in the sense that all the sectors in the VAS of a given user device are expected to attempt to receive and demodulate the transmissions from that user device, which can occur at 408. Likewise, the user device is expected to attempt reception of transmissions from all the sectors in its VAS. Thus, on the user device side, all transmissions can be performed using the scrambling code and original resource allocation of its nominal sector, and the user device can receive and demodulate power control commands and reverse activity commands from all sectors in its VAS. Transmission of power control commands and reverse activity commands from an AMUD sector may require additional allocation of downlink resources (e.g., time slots, channelization codes . . . ) for communication of the power and rate control information for the user devices for which the sector is listed in the corresponding VAS.

FIG. 5 is an illustration of a methodology 500 for communicating information in a UMTS TDD communication environment using a VAS in accordance with one or more aspects described herein. From a network point of view, all sectors in a user device's VAS can transmit power control commands and/or messages, as well as reverse activity commands and/or messages to the user device, at 502. Transmission of downlink information at each sector is consistent with its associated scrambling code. Additionally, all sectors in the user device's VAS can attempt to receive and demodulate transmissions from the user device, and can have knowledge of channel and resource assignments in the nominal sector of the user device. At 504, the user device can transmit data using a scrambling code associated with the user device's nominal sector. At 506, in the event that a downlink soft handoff has occurred, the nominal sector of the user device will have changed, and the user device can begin transmitting with the new nominal sector's scrambling code. Such information can be shared with all sectors in the user device's VAS (e.g., via a network controller, . . . ) in order to update resource/channel information and the like.

Rules for interpretation of the power and rate commands at the user device can follow the same rationale as in EvDO systems, such as "OR of downs" for power control and "OR of busy" for the reverse activity command. Additionally, the described algorithm does not interfere with the regular downlink handoff in any way other than the fact that a downlink handoff can change the sector identified as the "nominal sector". With the change of "nominal sector", the user device will begin utilizing the scrambling code and channel/resources corresponding to the new "nominal sector."

FIG. 6 illustrates a methodology 600 for generating a physical channel dedicated for transmission of power and rate control information for a user device in a UMTS TDD wireless communication environment, in accordance with various aspects set forth herein. At 602, a physical channel can be created for transmission of power and rate control information for a user device that lists a given sector in its VAS and for which the sector is not the "nominal sector" of the user device. At 604, a plurality of levels of resource occupation (e.g., resources related to at least one of transmission power and transmission rate) can be defined such as busy/not busy, as well as intermediary levels such as "half-capacity," "one-quarter capacity occupied," "three-quarter-capacity occupied," or any other number of intermediary levels to increase system granularity and fine-tune control of system load. At 606, the sector for which the new channel was created at 602 can employ the new channel to communicate power control information as well as reverse activity and/or rate control information to all user devices having the sector listed in their respective VASs.

The power control information communicated at 606 can be a single up/down command as it is currently specified in UMTS TDD LCR or a message as it is currently done in UMTS TDD HCR. Similarly, rate control information communicated at 606 can also be a single busy/not busy command or it can have several levels for finer control of the system load. Rate control information can also be transmitted as part of a new physical channel or as part of a message. When performing rate control, one of the aspects that may be associated with the system load is the capability of the sector to receive and demodulate the user device transmission at the current rate. In that regard, a factor such as the available dimensionality for effective reception of the entire user device transmission, in particular, by the AMUD sectors, can be accounted for when generating rate control information. Indeed, efficient implementation of AMUD algorithms may limit the sector's capability of receiving and demodulating sectors outside of its signal space (e.g., user devices using scrambling codes other than the sector's scrambling code), and therefore the rate control information may indicate such to the user device.

The location in terms of physical channel resources of the transmission of the power control and reverse activity commands is irrelevant for the methods described herein. Therefore, the creation of a new physical channel carrying the power and rate control for all the user devices whose VAS contain that sector can greatly enhance efficiency of the algorithm. Alternatively, a message-based implementation can comprise each sector communicating to a controller the power and rate information for each specific user device to facilitate creating the message. Messages for each of the sectors associated with the network controller can then be delivered to the sectors for transmission to the user device(s) over the air. Alternatively, the power and rate control information from all the sectors in a user device's VAS may be conveyed on a message or a plurality of messages transmitted over the user device's "nominal sector".

Figure 7:
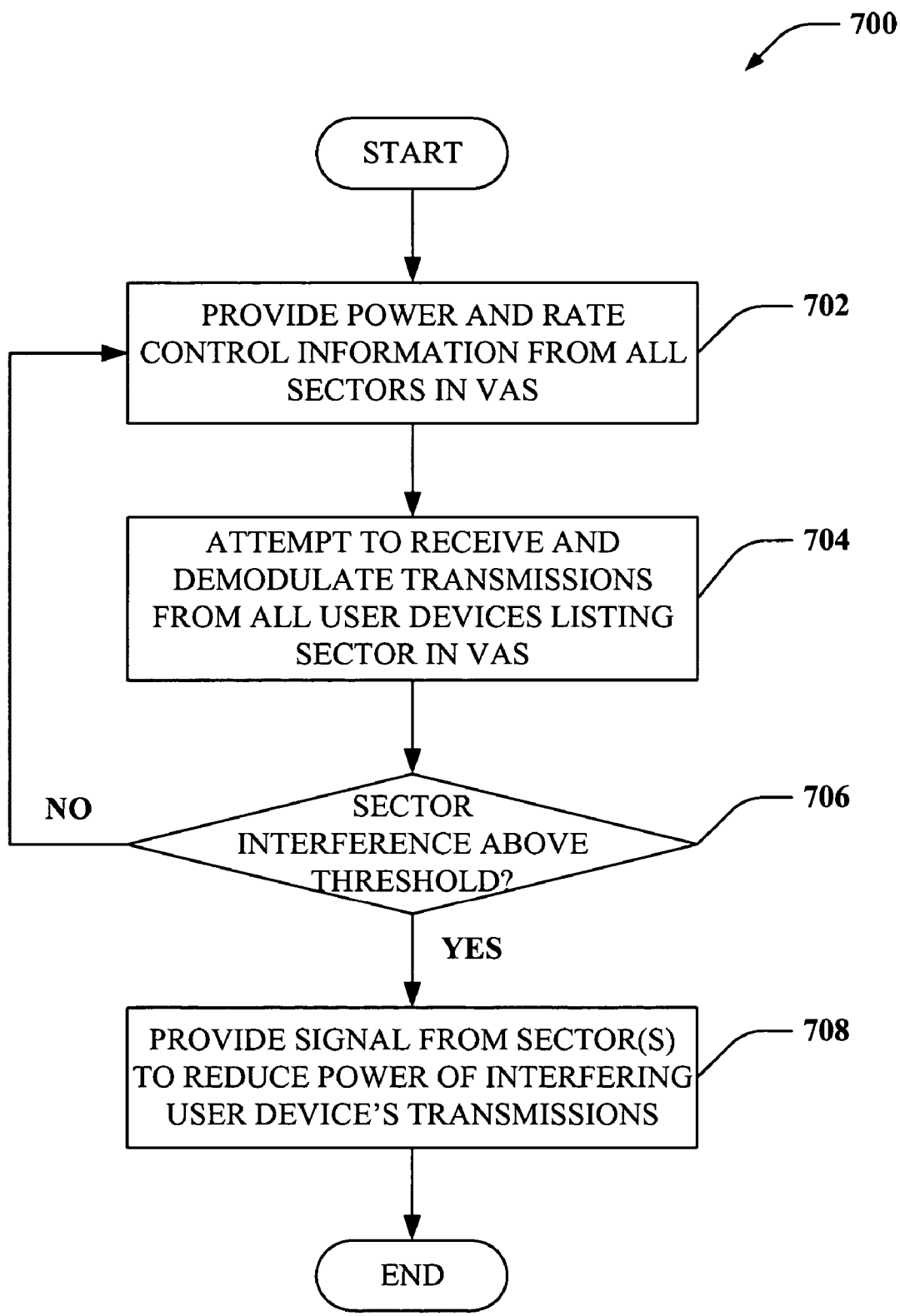
FIG. 7 is an illustration of a methodology for managing system load in a UMTS TDD wireless communication environment in accordance with various aspects.

FIG. 7 is an illustration of a methodology 700 for managing system load in a UMTS TDD wireless communication environment in accordance with various aspects. At 702, power and rate control information can be provided to a user device from all sectors (e.g., base stations) in the user device's VAS. At 704, all sectors listed in the user device's VAS can attempt to receive and demodulate transmissions from the user device, as set forth with regard to the previous figures. At 706, a determination can be made regarding whether interference in a given sector is above a predetermined threshold. If, at 706, it is determined that the sector is experiencing a greater level of interference than is desirable or permitted, then at 708, an offending user device (e.g., a user device contributing to the above-threshold interference level) can be have its transmission power and/or rate reduced to facilitate bringing the interference level back within acceptable levels. Such power and/or rate reduction can be achieved by signaling a region controller, which in turn can signal all sectors listed in the offending user device's VAS to alter the power control and/or rate control signals they are transmitting to the offending user device.

According to a related aspect, the offended sector itself can provide a signal to the offending user device to reduce its transmission power to bring the interference level caused thereby back below the predetermined acceptable threshold level at 708. According to this aspect, interference information need not be transmitted through a controller because the most-loaded sector (e.g., the offended sector) can broadcast a "busy" bit command at 708 that will be received by the offending user device to cause the device to reduce its transmit data rate (e.g., by virtue of the "OR of busy" rule), as will be understood by those skilled in the art.

If it is determined at 706 that an interference level is not above the predetermined threshold level, then the method can revert to 702 for continued transmission of power and/or rate control commands without adjustment thereto. In this manner, method 700 can facilitate providing feedback control of a plurality of user devices across a plurality of sectors and/or base stations to mitigate unacceptable levels of interference there between. Additionally, it will be appreciated that advanced multi-user detection techniques, as described with regard to this and preceding figures, can be employed by way of a linear block MMSE implementation or by other linear or non-linear adaptive scheme to facilitate interference cancellation, etc., as will be appreciated by one skilled in the art.

It will be appreciated that, in accordance with one or more embodiments and/or methods described herein, inferences can be made regarding performing a soft handoff of a user device, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding forming soft handoff on the uplink for a user device. For instance, with regard to sectors to be included in a VAS for a user device, inferences can be made regarding whether a given sector's beacon signal strength is sufficient to warrant including the sector in the user device's VAS. According to this example, a sector that is potentially capable of receiving and decoding signals from the user device can have it's beacon signal monitored, and an inference can be made regarding whether such signal exhibits a strength above a predetermined threshold level. If so, the sector can be included in the user device's VAS as a sector that is capable of communicating with the user device. If the beacon signal strength for the sector is less than the predetermined threshold value, inferences can be made regarding whether to include the sector in the user device's VAS nonetheless, based on, for instance, a direction of travel of the user device (e.g., wherein the user device's previously mapped position information indicates that the user device is headed toward the sector in question), and the like.

According to another example, inferences can be made by a region controller regarding which sectors to include in a user's VAS. Such inferences can be based on, for instance, communication traffic in one or more potential VAS sectors, such that a sector experiencing capacity-level traffic can be temporarily excluded from the VAS of a user device at an edge of the sector. In a similar example, a controller can make inferences regarding excluding one or more sectors based on a presence of other sectors with stronger communication capabilities and/or signals at a given time. It will be appreciated that the foregoing examples are illustrative in nature and are not intended to limit the number of inferences that can be made or the manner in which such inferences are made in conjunction with the various embodiments and/or methods described herein.

Figure 8:
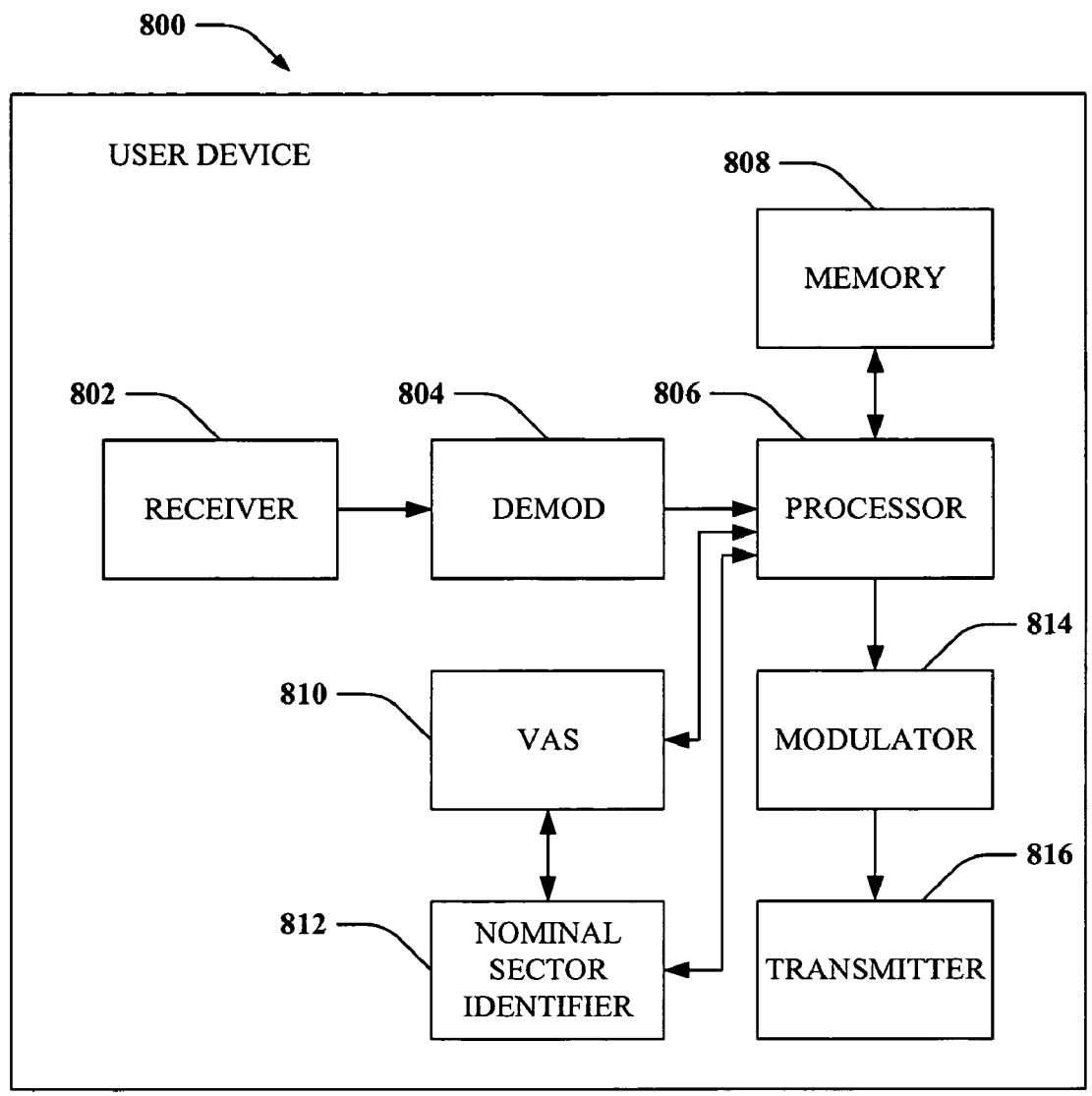
FIG. 8 is an illustration of a user device that facilitates performing uplink soft handoff in a UMTS TDD wireless communication environment, in accordance with one or more embodiments described herein.

FIG. 8 is an illustration of a user device 800 that facilitates performing uplink soft handoff in a UMTS TDD wireless communication environment, in accordance with one or more embodiments described herein. User device 800 comprises a receiver 802 that receives a signal from, for instance, a receive antenna, and performs typical actions (e.g., filters, amplifies, downconverts, etc.) on the received signal and digitizes the conditioned signal to obtain samples. A demodulator 804 can remove any cyclic prefix appended to each symbol, and can obtain received symbols for subbands for each symbol period, as well as provide received pilot symbols to a processor 806 for channel estimation.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816 and controls one or more components of user device 800.

User device 800 can additionally comprise memory 808 that is operatively coupled to processor 806 and that stores information related to a VAS 810 of the user device 800, sectors in the VAS 810, sector selection protocols and/or algorithms, scrambling code information related to a nominal sector for user device 800, or any other suitable information related to facilitating soft handoff on the uplink for user device 800, as described herein. Memory 808 can additionally store information associated with sector identities, designations (e.g., serving, nominal, AMUD, . . . ), etc., such that user device 800 can employ stored protocols, algorithms, information to facilitate soft handoff as described herein. Still furthermore, memory 808 can be updated over time with measurements from the network side regarding the ability of a given sector (e.g., base station) to continue demodulating signals from user device 800. For example, a controller (not shown), can maintain an up-to-date VAS 810 for each user device in a network, and can update memory 808 through a current serving sector for user device 808. Additionally, controller can provide all sectors in a user device's 800 VAS 810 with information related to channels allocated to user device 800, as well as resources allocated to the nominal sector to facilitate communication between user device 800 and a serving sector while employing a scrambling code assigned to the nominal sector, etc.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 808 is further coupled to a VAS 810 that can facilitate soft handoff by one or more base stations, based at least in part on information stored in memory 808 and/or information received and processed by processor 806. VAS 810 can be operatively associated with a nominal sector identifier 812, which can also be coupled to processor 806, and which can ensure that transmissions emanating from user device 800 are transmitted using a scrambling code of the user device's nominal sector, which can be included in the VAS 810 and in memory 808 of user device 800. User device 800 still further comprises a symbol modulator 814 and a transmitter 816 that transmits the modulated signal using the scrambling code associated with the nominal sector identified the nominal sector identifier 812. In this manner, user device 800 can facilitate uplink soft handoff between sectors in the VAS 810, in a UMTS TDD communication environment.

Figure 9:
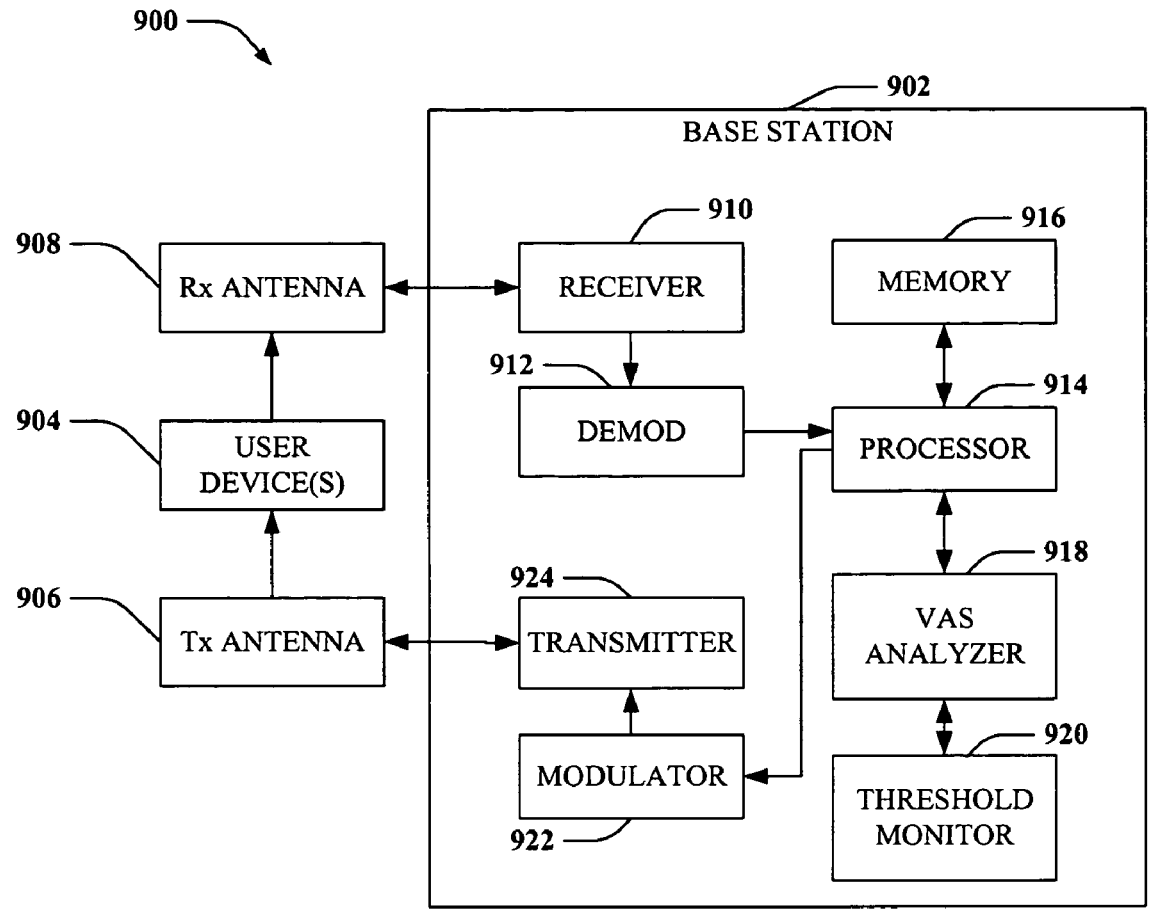
FIG. 9 is an illustration of a system that facilitates uplink soft handoff in a UMTS TDD wireless communication environment in accordance with one or more aspects set forth herein.

FIG. 9 is an illustration of a system 900 that facilitates uplink soft handoff in a UMTS TDD wireless communication environment in accordance with one or more aspects set forth herein. System 900 comprises a base station 902 that communicates with one or more user devices 904 via a transmit antenna 906 and a receive antenna 908, although more than one transmit and receive antenna can be employed in conjunction with various aspects. Base station 902 comprises a receiver 910 that receives information from receive antenna 908 and is operatively associated with a demodulator 912 that demodulates received information. Demodulated symbols can be analyzed by a processor 914 that is similar to the processor described above with regard to FIG. 8, which is coupled to a memory 916 that stores information related to user devices, 904, a VAS for each user device 904, sector identities stored in each user device's VAS, including a nominal sector, and any AMUD sectors in each VAS, along with scrambling codes for such sectors, time slot information and the like, resource allocations, and/or any other suitable information related to permitting base station 902 to perform a soft handoff on the uplink as described herein.

Processor 914 is further coupled to a VAS analyzer 918 that can process information related to user device VASs, updates thereto, resources allocated to user devices 904 and/or other sectors listed in each user device's VAS in which base station 902 is listed, etc., to permit a modulator 922 and/or transmitter 924 in base station 902 to appropriately modulate and transmit a communication signal to user device 904 via transmit antenna 906. Based on such information, base station 902 can transmit to user device 904 using its associated scrambling code and on a channel allocated to user device 904. The channel allocated to user device 904 may be shared with other user devices to minimize overhead.

Additionally, VAS analyzer 918 can be operatively associated with a threshold monitor 920 that can continuously evaluate and/or assess an interference level in the sector served by base station 902. For example, a user device listing base station 902 in its VAS can transmit a signal that base station 902 can attempt to demodulate, but at a power level that is detrimentally high for base station 902 (e.g., at a level that causes an interference level to exceed the acceptable threshold level). VAS analyzer 918 can determine which user device is responsible for the offensive transmission, and base station 902 can signal all stations in the user device's VAS to transmit power command signals (and/or rate control information) to reduce the user device's transmission power. In this manner, an offensive user device can be collectively signaled by all sectors capable of receiving and demodulating signals there from to permit feedback control of the user device's transmissions on the uplink.

It will be appreciated that base station 902 can be a serving station, a nominal station, or an AMUD station in the one or more user device's 904 VAS at any given point in time, and can switch there between upon an indication from a controller (not shown) and/or upon selection as a serving sector base station by a user device. Additionally, base station 902 can attempt to receive and decode signals from all user devices 904 with VASs in which base station 902 is listed. Furthermore, all such base stations in all AMUD sectors listed in a VAS can have knowledge of channel assignments and resource allocations in the nominal sector of a particular user device for each such AMUD sector. With such information, an AMUD sector can transmit power control commands and/or reverse activity commands to a given user device listing the AMUD sector in its VAS, and can receive and demodulate transmissions from such user devices.

Figure 10:
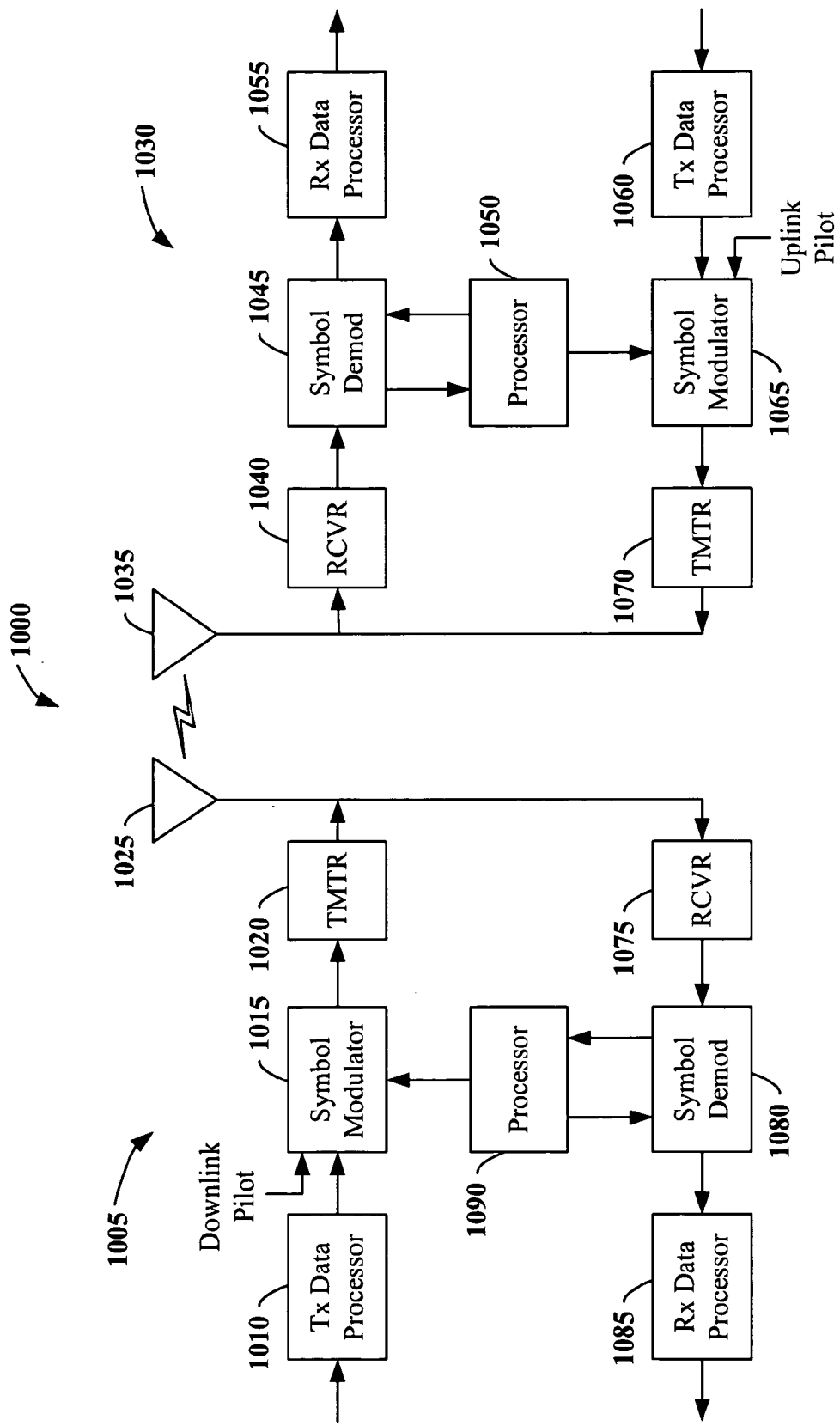
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 8-9) and/or methods (FIGS. 4-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. Symbol modulator 1015 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for power and rate control a wireless communication environment, comprising:
    evaluating, by a network controller, a virtual active set (VAS) of a user device, wherein the VAS comprises a list of sectors, other than a nominal sector serving the user device, capable of receiving and demodulating user device uplink transmissions;
    identifying if the user device causes uplink interference in the sectors listed in the VAS;
    providing the sectors listed in the VAS with channel and resource assignment information assigned to the user device by the nominal sector, and a scrambling code employed by the user device in the nominal sector,
    wherein the provided channel and resource assignment information and scrambling code allow the sectors listed in the VAS to receive and demodulate signals from the user device; and
    instructing the sectors listed in the VAS in which the user device causes uplink interference to transmit to the user device, using the scrambling code of the nominal sector, an uplink power control command requiring the user device to reduce power of uplink transmissions in the sector from which the command was initiated and a reverse activity command requiring the user device to reduce transmit data rate in the sector from which the command was initiated.

2. The method of claim 1, wherein the initiating further comprises transmitting the power control command to the user device from all sectors listed in the VAS.

3. The method of claim 1, wherein the initiating further comprises transmitting the reverse activity command to the user device from all sectors in the VAS.

4. The method of claim 3, wherein the transmitting further comprises transmitting rate control information in the reverse activity commands from all sectors listed in the VAS.

5. The method of claim 1, wherein the initiating further comprises employing the scrambling code employed by the user device to transmit commands from the all sectors listed in the VAS to the user device.

6. The method of claim 1, further comprising providing at least one of the channel assignment information, time slot information, and code assignment information in the resource assignment information.

7. The method of claim 1, wherein the identifying further comprises identifying that the user device is transmitting at a level above a threshold level, the threshold level being indicative of a power level that causes interference at a sector base station in the VAS.

8. The method of claim 7, further comprising providing the power control command from the nominal sector to the user device to reduce transmission power at the user device.

9. The method of claim 7, further comprising employing a base station controller that receives information related to the user device and signals all sectors in the VAS of the user device to transmit the power control command instructing the user device to reduce transmission power.

10. The method of claim 1, further comprising updating the VAS periodically with measurements related to sectors' ability to begin and/or continue receiving and demodulating transmissions from the user device.

11. The method of claim 10, further comprising evaluating whether the user device is within a coverage area of a sector and determining whether to include the sector in the VAS.

12. An apparatus in a network controller that facilitates power and rate control in a wireless communication environment, comprising:
    a memory configured to store information relating to a virtual active set (VAS) for a user device, the VAS comprising a list of sectors, other than a nominal sector serving the user device, capable of receiving and demodulating user device uplink transmissions;
    a controller configured to:
        identify if the user device causes uplink interference in the sectors listed in the VAS; and
        provide the sectors listed in the VAS with channel and resource assignment information assigned to the user device by the nominal sector serving the user device, and a scrambling code employed by the user device in the nominal sector; and
    a processor that analyzes information stored in the memory, processes information received from the user device via the sectors listed in the VAS, using the channel and resource assignment information and the scrambling code, and instructs the sectors listed in the VAS in which the user device causes uplink interference to transmit to the user device, using the scrambling code of the nominal sector, an uplink power control command requiring the user device to reduce power of uplink transmissions in the sector from which the command was initiated and a reverse activity command requiring the user device to reduce transmit data rate in the sector from which the command was initiated.

13. The apparatus of claim 12, further comprising:
    a transmitter to transmit the power control and reverse activity commands.

14. The apparatus of claim 13, wherein the memory is further configured to store a sector list comprising the nominal sector, wherein the nominal sector assigns the scrambling code and communication resources to the user device.

15. The apparatus of claim 14, wherein the communication resources comprise at least one of a channel resource, a time slot, or a code resource.

16. The apparatus of claim 15, wherein the sectors listed in the sector list have knowledge of the scrambling code and communication resources assigned to the user device.

17. The apparatus of claim 16, wherein the processor further initiates the sectors in the sector list to transmit at least one of the power control command or the reverse activity command to the user device using the scrambling code.

18. The apparatus of claim 17, wherein the processor further identifies that the user device is transmitting at a power level above a threshold indicative of a power level that causes interference at a sector base station in the VAS.

19. The apparatus of claim 18, wherein the processor initiates transmission of the power control command to the user device instructing the user device to reduce transmit power to below the threshold.

20. A network control apparatus that facilitates supporting power and rate control in a wireless communication environment, comprising:
 means for evaluating, by a network controller, a virtual active set (VAS) of a user device, wherein the VAS comprises a list of sectors, other than a nominal sector serving the user device, capable of receiving and demodulating uplink user device transmissions;
 means for identifying if the user device causes uplink interference in the sectors listed in the VAS;
 means for providing the sectors listed in the VAS with channel and resource assignment information assigned to the user device by the nominal sector, and a scrambling code employed by the user device in the nominal sector,
 wherein the provided channel and resource assignment information and scrambling code allow the sectors listed in the VAS to receive and demodulate signals from the user device; and
 means for instructing the sectors listed in the VAS in which the user device causes uplink interference to transmit to the user device, using the scrambling code of the nominal sector, an uplink power control command requiring the user device to reduce power of uplink transmissions in the sector from which the command was initiated and a reverse activity command requiring the user device to reduce transmit data rate in the sector from which the command was initiated.

21. The apparatus of claim 20, further comprising means for detecting that the user device is transmitting at a power level above a threshold level indicative of power level that causes interference at a sector base station in the VAS.

22. The apparatus of claim 21, further comprising means for transmitting the power control command from the nominal sector to cause the user device to reduce transmission power.

23. The apparatus of claim 20, wherein each sector in the VAS has knowledge of the scrambling code associated with the nominal sector of the user device.

24. The apparatus of claim 23, wherein each sector employs the scrambling code to receive and demodulate signals from the user device, and to modulate and transmit power control and reverse activity commands to the user device.

25. The apparatus of claim 20, further comprising means for monitoring a plurality of sectors' ability to receive and demodulate signals from the user device.

26. The apparatus of claim 25, further comprising means for updating the VAS periodically, based at least in part on information generated by the means for monitoring.

* * * * *